United States Patent [19]

Suzuki et al.

[11] Patent Number: 4,465,097
[45] Date of Patent: Aug. 14, 1984

[54] COUPLING

[76] Inventors: Hideo Suzuki, Tokyo; Tsurukichi Sakuma, Gunma, both of Japan

[73] Assignee: New-Machine Co., LTD.

[21] Appl. No.: 366,000

[22] Filed: Apr. 6, 1982

[30] Foreign Application Priority Data

Apr. 9, 1981 [JP] Japan .................................. 56-51086

[51] Int. Cl.$^3$ ............................................. F16L 37/06
[52] U.S. Cl. ......................... 137/614.04; 137/614.05;
251/149.6; 285/86; 285/177; 277/235 R
[58] Field of Search ..................... 285/81, 82, 86, 316;
137/614.02, 614.04, 614.05; 251/149.6; 277/235 R, 177

[56] References Cited

U.S. PATENT DOCUMENTS

| | | | |
|---|---|---|---|
| 2,265,267 | 12/1941 | Cowles | 251/149.6 |
| 2,665,928 | 1/1954 | Omon et al. | 137/614.04 |
| 3,039,794 | 6/1962 | De Cenzo | 285/86 |
| 3,071,386 | 1/1963 | Scannell | 277/177 |
| 3,477,731 | 11/1969 | Workman | 277/235 |
| 3,573,872 | 4/1971 | Sannes | 277/235 |
| 3,836,114 | 9/1974 | Norton et al. | 251/149.6 |
| 4,114,853 | 9/1978 | Medvick | 251/149.6 |

Primary Examiner—A. Michael Chambers
Attorney, Agent, or Firm—Schwartz, Jeffery, Schwaab, Mach, Blumenthal & Koch

[57] ABSTRACT

A coupling comprises a socket and a plug removably connected thereto. In the socket and the plug, a first fluid passage and a second fluid passage are formed, respectively. An on-off valve chamber, a first packing chamber and a second packing chamber are arranged in succession in the socket. An elastic packing member and a sealing member are disposed in the first and second chambers, respectively, so that their adjacent surfaces are pressed against each other. An on-off valve chamber having a cylindrical valve body is located in the on-off valve chamber in such a manner that the valve body can approach the first packing chamber and recede from it. It is urged toward the packing by a compression coil spring. An abutment which abuts against the packing is formed on an intermediate portion of the valve body. A communication passageway is provided in the portion of the valve body between the abutment and the free end of the valve body in order to effect communication between the first and second fluid passages through it when the on-off valve is opened. The plug has an insertion section inserted into the socket. As the insertion section is inserted into the socket, it presses the valve body and allows the abutment to be separated from the packing to thereby to permit communication between the first and second fluid passages.

14 Claims, 11 Drawing Figures

COUPLING

BACKGROUND OF THE INVENTION

The present invention relates to a coupling for passages of a fluid such as a gas.

In general, a coupling comprises a socket and a plug connected thereto. A conventional coupling is disclosed in Japanese Utility Model Publication No. Sho 53-2811. In this prior art, an annular valve seat B is disposed in a socket A, and a hollow cylindrical valve body D whose rear end is blind is inserted in the valve seat B so as to be axially slidable, as shown in FIG. 1. A plurality of communication bores C are circumferentially formed in the central portion of the wall of the valve body D. Further, a stepped annular packing F in which a conical metal ring E is embedded is fixedly inserted at its step portion in the valve seat B. When a plug G is inserted into the socket A so as to allow the fluid flow therethrough, the outer circumferential surface of the plug G is brought into contact with the inner circumferential surface of the packing F. The inner end of the valve body D is normally biased by a coil spring H to close the coupling. An O-ring K is disposed at the outer circumference of the front end of the valve body D. When the valve body D is closed, the O-ring K is in contact with the inner edge of a flange L of the valve seat B which faces inward so as to effect sealing between the flange L and the valve body D.

In the conventional coupling of this type, the communication bores C are located in the valve seat B when the valve body D is closed, as shown in FIG. 1. When the plug G is inserted into the socket A, the communication bores C are located outside the valve seat B, and the interior of the socket A communicates with that of the plug G. Therefore, when the plug G is inserted into the socket A in order to allow a fluid such as gas to flow, the flange L is removed from the O-ring K before the communication holes C are exposed to the interior of the socket A. The fluid in the socket A may flow into a gap between the inner edge of the flange L and the outer peripheral wall of the valve body D and then into a space between the packing F and the valve body D. Thereafter, the fluid may leak a gap between the rear end of the socket A and the rear end of the plug G to the outside of the coupling.

When the plug G is inserted into the socket A to open the coupling, the socket A is sealed from the plug G by only one packing F, resulting in insufficient seal.

When the valve body D is opened or closed, the valve body D must be moved beyond the inner edge of the flange L. For a quick operation, the stroke of the valve body D is required to be shortened. This necessitates the flanged portion of the valve seat B to be very thin. The valve seat B supports the valve body D at a very short width, resulting in an unstable supporting, thus preventing smooth movement of the valve body D when it is opened and closed.

SUMMARY OF THE INVENTION

An object of the present invention is to provide a coupling in which no leakage occurs when it is opened and closed and when it is in a transient position between opened and closed ones.

Another object of the present invention is to provide a coupling which is provided with a valve seat supporting a longer portion of a valve body for a stable operation.

Still another object of the present invention is to provide a coupling which has a plurality of packings to allow for satisfactory sealing.

A further object of the present invention is to provide a coupling which connects a socket with a plug firmly and prevents the sleeve from being moved by an unexpected external force to thereby avoid inadvertent removal of the socket from the plug.

In order to achieve the above objects of the present invention, there is provided a coupling comprising a socket which has a first fluid passage, and a plug which has a second fluid passage communicating with the first fluid passage and which is inserted into and locked to the socket.

In an intermediate part of the socket, an on-off valve chamber and first and second packing chambers are formed coaxial with the first fluid passage in this order as viewed from the remote end of the socket from the plug. An elastic packing is disposed in the first packing chamber and a seal member which tightly contacts with the elastic packing on their adjacent surfaces is disposed in the second packing chamber. A cylindrical valve body aligned with the first fluid passage is normally biased toward the first and second packing chambers by biasing means. The cylindrical valve body is supported by a support member fixed to the socket so that it is only reciprocable along the first fluid passage. A flange-shaped abutment formed at an intermediate portion of the cylindrical valve body is arranged so that it contacts with or it is separated from the surface of the packing opposite to that mentioned above in response to the reciprocal movement of the cylindrical member. A communication passageway is formed between the abutment and an end of the cylindrical valve body which is close to the first and second packing chambers. The communication passageway communicates with the second fluid passage. It also communicates with the on-off valve chamber when the packing is separated from the abutment.

The plug is inserted from the end of the socket which is closer to the second packing chamber than to the on-off valve chamber into the socket. By the insertion, the leading end face contacts the corresponding end of the valve body and thereafter it removes the abutment from the packing. After the abutment is separated from the packing at a predetermined distance, the plug is locked to the socket.

According to another aspect of the present invention, the coupling comprises a locking mechanism provided between the socket and the plug for locking the plug to the socket.

BRIEF DESCRIPTION OF THE DRAWINGS

This invention is fully understood from the following detailed description with reference to the accompanying drawings in which.

DETAILED DESCRIPTION OF THE PREFERRED EMBODIMENTS

Figure 1:
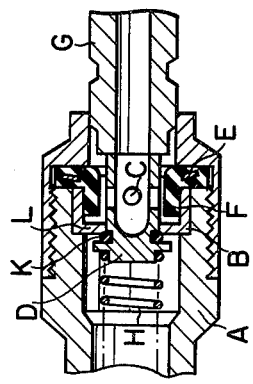
FIG. 1 is a longitudinal sectional view of the main part of a conventional coupling.
Figure 2:
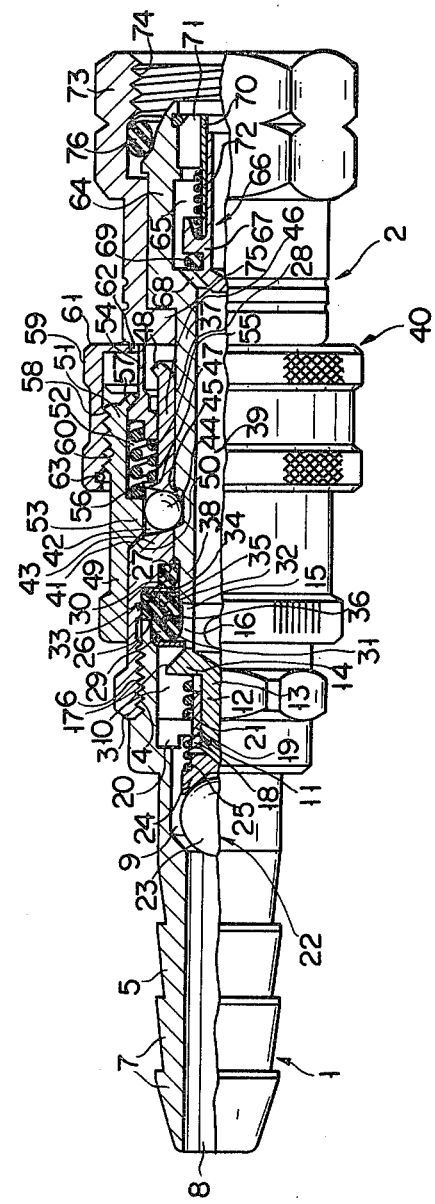
FIG. 2 is a partially broken front view of a coupling according to one embodiment of the present invention.
Figure 3:
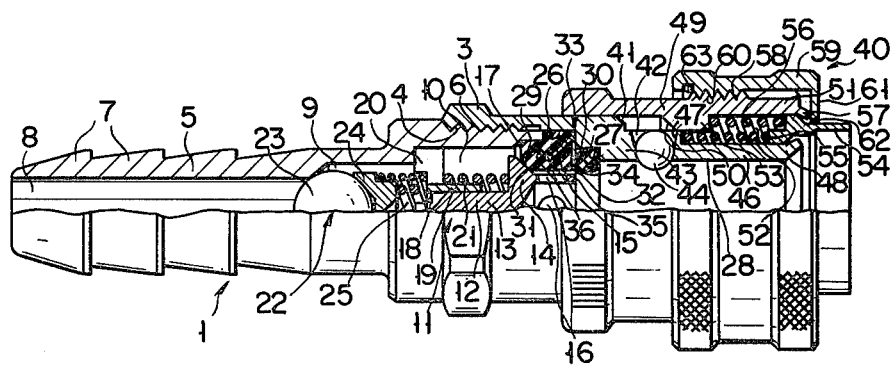
FIG. 3 is a partially broken front view of the socket of the coupling of FIG. 2.
Figure 4:
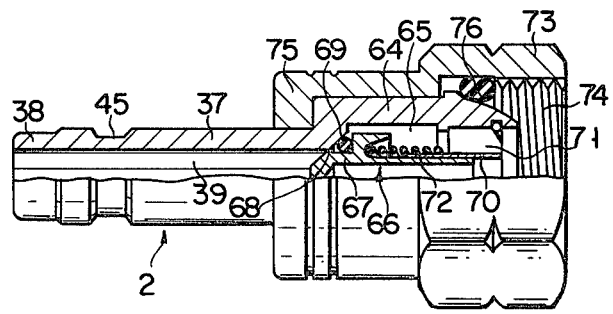
FIG. 4 is a partially broken front view of the plug of the coupling of FIG. 2.

Referring to FIGS. 2 to 4, a coupling comprises a socket 1 of a substantially cylindrical shape and a plug 2 of a substantially cylindrical shape which is detachably mounted on the socket 1.

The socket 1 has a ring-shaped socket body 3 which has internal screw threads 4, and a cylindrical connecting pipe 5 which has external screw threads 6 engaged with the internal screw threads 4 and a sawtoothed engaging portions 7 on its outer circumference and which is connected to a gas hose or the like.

A cylindrical fluid passage 8 is formed coaxial with the connecting pipe 5 in it. A cylindrical check valve chamber 9 is formed in the connecting pipe 5. The check valve chamber 9 is coaxial with the fluid passage 8 and has a diameter larger than that of the fluid passage 8. An on-off valve chamber 10 is formed adjacent to the check valve chamber 9 and opend to the check valve chamber 9 and the end of the connecting pipe 5 which engages the socket body 3, the end being hereinafter called said engaged end. The on-off valve chamber 10 is coaxial with the check valve chamber 9 and the diameter of the on-off valve chamber 10 is larger than that of the check valve chamber 9.

An on-off valve 11 is disposed in the on-off valve chamber 10. The on-off valve 11 has an on-off valve body 12 comprising a solid cylindrical stem portion 13, a disc-shaped abutment 14 extending radially outwardly from an intermediate portion of the outer peripheral wall of the stem portion 13, and a hollow cylindrical communication portion 15 formed near said engaged end. Communication bores 16 are circumferentially formed in the peripheral wall of the communication portion 15. The surface of the abutment 14 which faces said engaged end of the connecting pipe 5 is a truncated conical surface 17. The free end of the stem portion 13 has a truncated conical surface.

The on-off valve 11 has a support mechanism 18 comprising a sleeve 19 into which the stem portion 13 inserted, and supporting means 20 mounted on the outer circumference of the end of the sleeve 19. close to the check valve chamber 9 for fixing the sleeve 19 into the on-off valve chamber 10. The supporting means 20 may comprise blades radially extending from the sleeve 19. Alternatively, the supporting means 20 may be a perforated disc which has circumferentially arranged bores. The outer end of the supporting means 20 is connected to the connecting pipe 5 in the on-off valve chamber 10. The outer circumference of the sleeve 19 has a diameter smaller than that of the inner circumference of the check valve chamber 9, and the check valve chamber 9 and the on-off valve chamber 10 normally communicate through a space between adjacent blades or bores formed on the disc. The flow of the fluid such as a gas is not prevented by the on-off valve 11.

The on-off valve 11 has a compression coil spring 21 surrounding the sleeve 19 and disposed between the abutment 14 and the supporting means 20. The compression coil spring 21 normally biases the on-off valve body 12 toward said engaged end of the connecting pipe 5.

A check valve 22 having a ball 23, a valve seat 24 disposed on the ball 23 close to the on-off valve chamber 10, and a weak compression spring 25 disposed between the valve seat 24 and the supporting means 20 is disposed in the check valve chamber 9. The check valve 22 serves to block the fluid passage 8 with the ball 23 when fluid pressure is not applied to the connecting pipe 5 or it is weaker than the biasing force of the spring 25, as shown in FIG. 3.

In the socket body 3, a first packing chamber 26, a second packing chamber 27 and a cylindrical bore 28 for receiving the plug end portion are continuously formed in the order as viewed from the internal screw threads 4. An annular packing 29 of rubber or the like is placed in the first packing chamber 26. An annular sealing member 30 such as an O-ring is mounted in the second packing chamber 27. The packing 29 and the sealing member 30 press against one another on their opposing surfaces. The diameters of chambers 26, 27 and 28 are reduced in this order.

Figure 5:
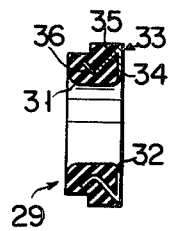
FIG. 5 is a cross sectional view of a packing used in the socket of FIG. 3.
Figure 6:
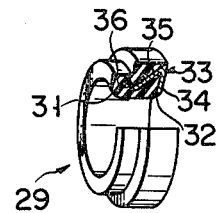
FIG. 6 is a partially cutaway perspective view of the packing of FIG. 5.
Figure 7:
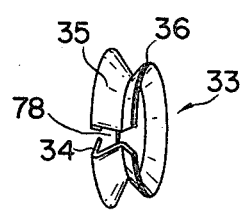
FIG. 7 is a perspective view of a metal ring embedded in the packing of FIG. 6.

As shown in FIGS. 5 and 6, the packing 29 has rounded inner edges 31 and 32. The inner wall of the packing 29 is apart from the outer circumference of the communication portion 15 of the on-off valve body 12. When the plug 2 is not connected to the socket 1, the conical surface 17 of the abutment 14 tightly contacts with the rounded inner edge 31 of the packing 29 by means of the compression coil spring 21. Thus, the fluid passage 8 does not communicate with the cylindrical bore 28.

Referring to FIGS. 2 to 7, an elastic reinforcing ring 33 made of metal such as steel is disposed in the packing 29. The reinforcing ring 33 comprises a disc portion 34 disposed between the packing 29 and the sealing member 30, a first truncated conical portion 35 which extends and is inclined from the outer circumference of the disc portion 34 to its own center and which faces the rounded inner edge 32, and a second truncated conical portion 36 which extends outwardly obliquely from the inner edge of the first truncated conical portion 35 and faces the rounded inner edge 31. The truncated conical portions 35 and 36 are embedded in the packing 29. The reinforcing ring 33 has at least one slit 78 so as to have elasticity.

The reinforcing ring 33 serves to increase elasticity of the packing 29 in the axial and radial directions thereof as a whole. The disc portion 34 increases elasticity of the sealing member 30. The first truncated conical portion 35 increase elasticity of the rounded inner edge 32. Similarly, the second truncated conical portion 36 increases elasticity of the rounded inner edge 31.

The plug 2 has a cylindrical insertion section 37 the diameter of which is the same as that of the cylindrical bore 28 of the socket body 3. The free end portion of the plug 2 is slightly reduced. When the plug 2 is sufficiently inserted in the socket body 3, its outer circumference tightly contacts with the sealing member 30 and the packing 29.

As the insertion section 37 is inserted into the cylindrical bore 28 of the socket body 3, the free end 38 of the insertion section 37 contacts with the sealing member 30 at first and then abuts against the opposed free end of the communication portion 15 of the on-off valve body 12. When the insertion section 37 is further inserted into the socket body 3, the free end 38 of the insertion section 37 pushes the abutment 14 and separates it from the packing 29 against the biasing force of the spring 21 with the sealing member 30 received in the free end portion of the insertion section 37. Therefore, a fluid passage 39 which is formed coaxial with the passage 8 in the insertion section 37 and the diameter of which is substantially the same as that of the fluid passage 8 can communicate with the passage 8 through the check valve chamber 9, the on-off valve chamber 10, the communication bores 16 and the communication portion 15. At this time, the free end 38 of the insertion section 37 also receives the rounded inner edge 32 of the packing 29. It follows that, before the free end 38 of the insertion section 37 abuts against the opposed end of the communication portion 15 of the on-off valve body 12, the outer periphery of the free end portion of the insertion section 37 is pressed against the inner surface of the sealing member 30, whereby the communication between the socket body 3 and the insertion section 38 is completely prevented. Accordingly, the socket body 3 is sealed from the insertion section 38 by the packing 29 and the sealing member 30 in a double manner, resulting in no fluid leakage between them.

In order to insert the insertion section 37 of the plug 2 into the socket to a predetermined depth and lock the plug 2 to the socket 1 firmly, a locking mechanism 40 as described below is used.

The diameter of the outer circumference of the socket body 3 is reduced at its intermediate portion and a truncated conical shoulder 41 is formed thereat. Truncated conical bores 42 are circumferentially formed in a cylindrical ball receiving portion 43 near the shoulder 41. A locking ball 44 is disposed in each truncated conical bore 42.

An annular groove or recesses 45 are formed in the outer circumference of the insertion section 37 of the plug 2 so as to receive the locking balls 44 when the insertion section 37 is inserted into the socket such that the on-off valve body 12 is opened to a desired extent.

A portion of the socket body 3 which extends beyond the bores 42 is a cylindrical portion 46 the diameter of which is further decreased. A stepped portion 47 is formed between the cylindrical portions 43 and 46. A flanged stop 48 is formed at the free end of the cylindrical portion 46.

A ring member 49 which has an inner surface complementary to the outer surface of the socket body 3 can be fitted on the socket body 3. A truncated conical stepped portion 50 formed in the ring member 49 abuts against the shoulder 41 of the socket body 3. An annular spring chamber 52 is formed at one end portion 51 of the ring member 49 which end is remote from the connecting pipe 5. A portion between the annular spring chamber 52 and the shoulder 41 constitutes an annular engaging portion 53 which pushes the ball 44 radially inward.

An annular spring seat 54 surrounds the cylindrical portion 46 of the socket body 3 in the annular spring chamber 52. The cylindrical portion 46 is reciprocable along the socket body 3. The annular spring seat 54 is biased by compression coil springs 55 and 56 which surround the cylindrical portion 46 and which are respectively disposed between the inner end face of the annular spring seat 54 and the stepped portion 47 and between the inner end face of the annular spring seat 54 and the end wall of the engaging portion 53. The annular spring seat 54 extends from the ring member 49 toward the free end of the cylindrical portion 146 by means of the springs 55, 56 (FIG. 3). An inwardly extending flanged stop 57 is formed at the free end of the end portion 51 of the ring member 49 so that the extend of the length of the annular spring support 54 extending from the ring member 49 is regulated.

External screw threads 58 are formed on the outer surface of the end portion 51 of the ring member 49. A ring knob 59 has internal screw threads 60 on its inner wall. The ring knob 59 engages the end portion 51 of the ring member 49 by causing the internal screw threads 60 to mesh with the external screw threads 58. An opening 62 which has a diameter larger than that of the annular spring seat 54 is formed at one end face 61 of the ring knob 59 opposite to the end with the internal screw threads 60. The annular spring seat 54 can be extended outside the ring knob 59 through the opening 62. A metallic stop ring 63 is formed at the portion of the inner surface of the ring knob 59 where the internal screw threads 60 begin such that the ring knob 59 is firmly locked to the ring member 49.

The plug 2 has a check valve housing section 64 extending from the other end of the insertion section 37. An annular check valve 66 is disposed in a check valve chamber 65 formed in the check valve support section 64.

The check valve 66 comprises an axially reciprocable cylindrical valve body 67, a communication opening 68 formed between the check valve chamber 65 and the fluid passage 39, an O-ring mounted on the end portion of the valve body 67 which is adjacent to the communication opening 68 so as to block the opening 68 when the valve body 67 is moved toward it, a sleeve 70 inserted by the valve body 67, supporting means 71 extending radially outwardly from the sleeve 70 in the check valve chamber 65 and fixed into the check valve housing section 64, and a weak compression coil spring 72 which surrounds the check valve body 67 and is disposed between the supporting means 71 and the check valve body 67. The compression coil spring 72 urges the check valve body 67 to allow the O-ring 69 to block the communication opening 68. The structure and function of the check valve 66, the sleeve 70, the supporting means 71 and the compression coil spring 72 are the same as those of the on-off valve 11, detailed description thereof being omitted.

A hollow cylindrical plug portion 73 is tightly mounted on the check valve housing section 64. The plug portion 73 has at its inner end an inwardly extending flange 75 abutting against the shoulder of the check valve housing section 64 such that it serves as a stop for the annular spring seat 54. An O-ring 76 is disposed between the plug portion 73 and the check valve housing section 64, thereby effecting sealing and connection therebetween. Formed in the free end portion of the plug portion 73 are internal screw threads 74 which enables the plug portion to connect with fluid equipment such as a burner.

In operation, as shown in FIG. 3, the ring knob 59 is tightened, and then the insertion section 37 of the plug 2 is inserted into the cylindrical bore 28. As the insertion section 37 is inserted, the free end 38 of the insertion section 37 pushes the on-off valve body 12 to open it. When the balls 44 are engaged with the annular groove 45 on the outer surface of the insertion section 37, the annular engaging portion 53 of the ring member 49 rides on the balls 44 and the balls 44 are pushed into the annular groove 45, whereby the plug 2 is connected to the socket 1. At this time, the compression coil springs 55 and 56 urge the ring member 49 toward the connecting pipe 5 and the annular spring seat 54 against the flange 75 of the plug portion 73. Since the annular engaging portion 53 tends to keep riding on the balls 44, the coupling between the socket 1 and the plug 2 is accomplished within the range of the force applied by the compression coil springs 55 and 56. When the ring knob 59 is loosened and its end face 61 contacts with the flange 75 of the plug portion 73, the ring member 49 does not move relative to the socket body 3 even if a considerably strong force is applied to the ring member 49, thus resulting in firm locking.

In this condition, fluid such as a gas flowing in the fluid passage 8 of the connecting pipe 5 forces to open the check valve 11 against the compression coil spring 21. The fluid reaches the fluid passage 39 in the insertion section 37 of the plug 2 through the check valve chamber 9, the on-off valve chamber 10 and the communication bores 16. Further, the fluid forces to open the check valve 66 against the compression coil spring 72 and flows into the equipment connected to the plug portion 73 through the check valve chamber 65. If the gas pressure is increased, for example, when the gas explodes in the equipment or when the gas is not supplied from a fluid source, the check valve 66 is closed, preventing reverse flow of the fluid such as a gas. The check valve 22 operates in the same manner as the check valve 66. Even if the check valve 66 fails to operate, the other check valve 22 works. Thus, the use of two check valves 22, 66 provides double protection of the reverse flow of the fluid in the coupling. In other words, the reverse flow of the fluid is completely prevented by the check valves 22 and 66.

In order to remove the plug 2 from the socket 1, the process of the above operation is reversed.

Figure 8:
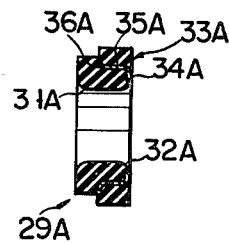
FIG. 8 is a cross sectional view of a packing according to another embodiment of the present invention.
Figure 9:
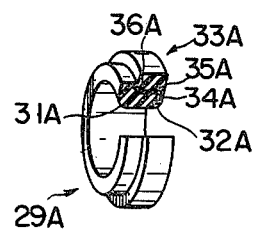
FIG. 9 is a partially cutaway perspective view of the packing of FIG. 8.
Figure 10:
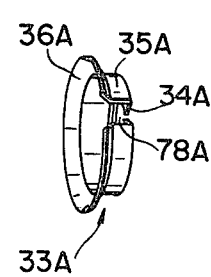
FIG. 10 is a perspective view of a metal ring embedded in the packing of FIG. 8.

A packing according to another embodiment of the present invention will be described with reference to FIGS. 8 to 10.

An annular packing 29A made of rubber is the same as the packing 29 described above except that a ring 33A of the packing 29A has a different structure from the ring 33 of the packing 29. The ring 33A comprises a disc portion 34A which is similar to the disc portion 34, a truncated conical portion 36A which is disposed in the packing 29A and which faces a rounded inner edge 31A of the packing 29A, and a cylindrical portion 35A which connects the outer edge of the disc portion 34A and the inner edge of the truncated conical portion 36A. The truncated conical portion 36A increases elasticity of the rounded inner edge 31A in the same manner as the second truncated conical portion 36. Edges 31, 32, 31A and 32A may not be of a rounded shape.

Figure 11:
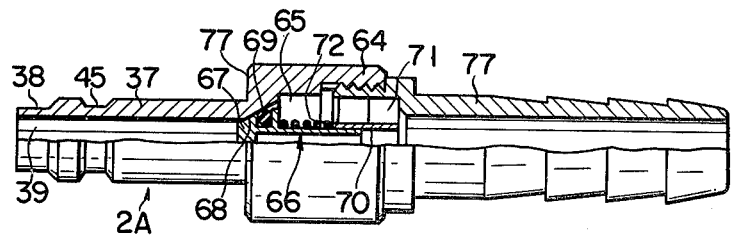
FIG. 11 is a partially broken front view of a plug according to another embodiment of the present invention.

FIG. 11 shows another embodiment of a plug. In a plug 2A, a connecting pipe 77 is used instead of the plug portion 73 of the plug 2. As seen from FIG. 11, the connecting pipe 77 is similar to the connecting pipe 5 of the embodiment of FIGS. 2 and 3 and it is used for connecting the plug 2 to a tubular member such as a hose. The same reference numerals of the plug 2A denote the same parts of plug 2, and a detailed description thereof will be omitted. In this embodiment, the shoulder 77 of the check valve 64 serves as a stop, that is, the flange 75 of the embodiment of FIGS. 2 and 4.

What we claim is:

1. A coupling comprising:
   a socket having a first fluid passage passing therethrough, and an on-off valve chamber, a first packing chamber and a second packing chamber formed in succession in said socket along said first fluid passage;
   an elastic packing disposed in said first packing chamber;
   a sealing member disposed in said second packing chamber, said sealing member and said elastic packing having adjacent surfaces pressed against each other;
   an on-off valve located in said on-off valve chamber and having a cylindrical valve body which can approach said first packing chamber and recede therefrom;
   an abutment formed on an intermediate portion of said valve body and adapted to abut against said packing;
   urging means for urging said valve body toward said packing;
   a communication passageway formed in said valve body and opened at its one end which is closer to said packing and at the outer surface of said valve body which is defined between said one end and said abutment;
   a plug fixed to said socket and having a second fluid passage passing therethrough, and an insertion section inserted from one end of said socket which is closer to said sealing chamber into said socket and having one end contacting with said one end of said valve body, whereby, as said plug is inserted into said socket, said insertion section separates said abutment from said packing to thereby effect communication between said first and second fluid passages;
   said coupling further comprising a locking mechanism for connecting said plug to said socket and comprising:
   a ball received in a hole formed in a lateral wall of said socket;
   a recessed receiving portion formed in an outer surface of said plug for receiving said ball when said insertion section is inserted into said socket;
   a ring member mounted on said socket and having an engaging portion for pushing said ball into said recessed receiving portion when said ring member is moved toward said on-off valve chamber;
   a shoulder formed on said socket and a stepped portion formed in said ring member and adapted to contact with said shoulder so as to prevent said engaging portion of said ring member from passing beyond said ball in a direction in which said insertion section is inserted into said socket;
   a first urging means for urging said ring member in a direction in which said shoulder contacts with said engaging portion; and
   a flange fixed to said socket and a seat reciprocably mounted on said socket and urged by said first urging means to be pressed against said flange.

2. A coupling according to claim 1, wherein said on-off valve is further provided in said on-off valve chamber with a supporting mechanism which allows for only reciprocating movement of said valve body.

3. A coupling according to claim 2, wherein said supporting mechanism comprises a sleeve into which said valve body is inserted, and holding means for fixing said sleeve into said on-off valve chamber.

4. A coupling according to claim 3, wherein said holding means comprises a plurality of blades extending radially outwardly from said sleeve.

5. A coupling according to claim 3, wherein said holding means comprises a disc member coaxially fixed to said sleeve and having a plurality of holes arranged circumferentially of said disc member.

6. A coupling according to claim 5, further comprising a metallic disc disposed between said packing and said sealing member.

7. A coupling according to claim 6, wherein said packing has two inner edges, and at least one edge of them, which is closer to said abutment is rounded.

8. A coupling according to claim 7, wherein said abutment has a truncated conical surface which faces said one inner edge of said packing.

9. A coupling according to claim 8, wherein said packing contains a metallic truncated conical portion fixed to said metallic disc and facing at least one inner edge of said packing.

10. A coupling according to claim 8, wherein said packing further contains a metallic cylindrical portion.

11. A coupling according to claim 1, wherein said locking mechanism further includes a ring knob threadably engaged with said ring member and contacting with said flange and separated therefrom according to the degree of engagement between said ring knob and said ring member.

12. A coupling according to claim 11, wherein said locking mechanism further includes a second urging means disposed between said ring member and said seat.

13. A coupling according to claim 12, wherein said locking mechanism further includes stops provided on said socket and said ring knob for engaging said seat to prevent said seat from being pulled off said socket.

14. A coupling according to claim 13, said first and second urging means are compression coil springs.

* * * * *